United States Patent
Galbasini et al.

(10) Patent No.: US 12,515,875 B2
(45) Date of Patent: Jan. 6, 2026

(54) CLOSING DEVICE FOR A CONTAINER AND CONTAINER HAVING SUCH A DEVICE

(71) Applicant: Goglio S.p.A., Milan (IT)

(72) Inventors: Roberto Galbasini, Milan (IT); Andrea Maccagnan, Milan (IT)

(73) Assignee: Goglio S.p.A., Milan (IT)

( * ) Notice: Subject to any disclaimer, the term of this patent is extended or adjusted under 35 U.S.C. 154(b) by 131 days.

(21) Appl. No.: 18/692,857

(22) PCT Filed: Sep. 16, 2022

(86) PCT No.: PCT/IB2022/058748
§ 371 (c)(1),
(2) Date: Mar. 18, 2024

(87) PCT Pub. No.: WO2023/052895
PCT Pub. Date: Apr. 6, 2023

(65) Prior Publication Data
US 2025/0136357 A1    May 1, 2025

(30) Foreign Application Priority Data
Sep. 29, 2021   (IT) ................. 102021000024947

(51) Int. Cl.
*B65D 88/54* (2006.01)
*F16K 7/06* (2006.01)
*F16K 31/54* (2006.01)

(52) U.S. Cl.
CPC .............. *B65D 88/54* (2013.01); *F16K 7/06* (2013.01); *F16K 31/54* (2013.01)

(58) Field of Classification Search
CPC ............ B65D 88/54; F16K 7/06; F16K 31/54
See application file for complete search history.

(56) References Cited

U.S. PATENT DOCUMENTS

| 3,467,151 A | 9/1969 | Vogt |
| 2014/0117261 A1* | 5/2014 | Ohki .................. F16K 7/065 |
| | | 251/7 |

FOREIGN PATENT DOCUMENTS

| CN | 111677906 | 9/2020 |
| DE | 102016125134 | 6/2018 |
| DE | 102018009537 | 6/2020 |

OTHER PUBLICATIONS

International search report and written opinion dated Dec. 14, 2022; Application No. PCT/IB2022/058748; 12 pages.

* cited by examiner

*Primary Examiner* — Timothy L Maust
(74) *Attorney, Agent, or Firm* — Erik J. Overberger; RANKIN, HILL & CLARK LLP

(57) ABSTRACT

The present disclosure relates to a closing device for a container adapted to hold liquid, pasty, granular or powder products, comprising:
a tubing element defining a duct extending between a first opening that can be associated with a mouth of the container and a second opening that can be engaged with a filling or tapping head;
a valve body applied to the tubing element and configured to selectively allow the passage of the liquid, paste, granular or powder product through the duct of the tubing element.

A feature of the present disclosure is that:
the tubing element is made of elastically deformable material;
the valve body comprises throttling members operable between a clamped configuration in which they are configured to engage, in an intermediate position between the first and second openings, the tubing element thereby deforming it to occlude the duct, and (Continued)

a rest configuration in which they are configured to disengage the tubing element leaving it in its undeformed state.

8 Claims, 4 Drawing Sheets

CLOSING DEVICE FOR A CONTAINER AND CONTAINER HAVING SUCH A DEVICE

TECHNICAL FIELD

The present invention relates to a closing device for a container adapted to hold in particular liquid or pasty products, but also granular or powder products, in accordance with the preamble of claim 1.

The object of the present invention is employed in the field of storage of products in liquid, pasty, granular or powder form. In particular, the device and the relative container object of the present invention can be used for storing food products in liquid or pasty form which, for hygienic reasons, need to come into contact only and exclusively with aseptic devices.

State of the Art

Various containers for storing liquid, pasty, granular or powder products are known in the state of the art. In particular, industrial containers for foodstuffs with different capacity values equal to or greater than 5 L, but also 100 L, are known.

These industrial containers have an inner volume adapted to receive liquid, pasty, granular or powder products, and a mouth placed in fluid connection with this inner volume to allow filling and tapping operations.

In order to close the mouth of the container and enable the operations indicated above, such industrial containers comprise a tubing and a valve that are connected in series with the mouth. Typically, the valve is of the butterfly or ball type and is configured to allow or inhibit access to the inner volume of the container through the mouth.

In detail, said valve comprises a channel adapted to let liquid, pasty, granular or powder products flow in its inside, and a stop element positioned in the channel to selectively open or close the channel itself.

In more detail, the stop element is switchable between a closure configuration, in which it is configured to totally obstruct the channel by inhibiting the passage of the product through the valve, and an opening configuration in which it leaves the channel at least partially free allowing the passage of the product through the valve.

In the butterfly type valves, the stop element is a rotary wall arranged inside the duct, while in the ball type valves it is a body with spherical geometry having a through hole that when aligned with the duct it allows the passage of the liquid product.

It should be noted that in the industrial containers known in the state of the art, the stop element of the valve and the duct enter into direct contact with the product to be introduced into the container or to be tapped. Therefore, in order to avoid contaminations of the food products that pass through the valve, continuous sterilization operations are necessary that are adapted to ensure the asepticity of the duct and of the stop element of the valve.

Disadvantageously, these sterilization operations and the direct contact of the product with the duct and the stop element severely limit the range of materials that can be used for the realization of the valve to those that, at the same time, are sterilizable and suitable for food contact.

Examples of valves of the prior art are described in US 2014/117261 and U.S. Pat. No. 3,467,151.

OBJECT OF THE INVENTION

In this context, the task of the technician underlying the present invention is to propose a closing device for a container for storing liquid or pasty, but also granular or powder products that overcomes the drawbacks of the prior art mentioned above.

In particular, it is an object of the present invention to make available a closing device for containers adapted to hold food products, preferably in liquid or pasty form, capable of expanding the range of materials that can be used for the realization thereof.

In other words, it is an object of the present invention to make available a closing device in which the valve body, configured to inhibit or enable the introduction/extraction of the food product in liquid or pasty form into/from the container, can also be made in materials unsuitable for the contact with foodstuffs.

SUMMARY OF THE INVENTION

The specified technical task and the specified purposes are substantially achieved by a closing device for a container which overcomes the drawbacks of the prior art mentioned above.

In accordance with the preamble of claim 1, the object of the present invention is a closing device for a container adapted to hold liquid or pasty, but also granular or powder products.

In detail, the closing device object of the present invention comprises a tubing element and a valve body.

The tubing element defines a duct extending between a first opening that can be associated with the mouth of the container and a second opening that can be engaged with a filling or tapping head.

The valve body is applied to the tubing element between the first and second openings and is configured to selectively allow the passage of the liquid, pasty, granular, or powder product through the duct of the tubing element.

In detail, the tubing element is made of an elastically deformable material, and the valve body comprises throttling means operable between a clamped configuration and a rest configuration.

In the clamped configuration, the throttling means are configured to engage, in an intermediate position between the first and second openings, the tubing element, thereby deforming it to totally occlude it, while in the rest configuration they are configured to disengage the tubing element leaving it in its undeformed configuration.

It should be noted that in the device object of the present invention the throttling means of the valve body act on the tubing element, inside which the liquid, pasty, granular or powder product flows, deforming it to occlude it.

Therefore, it is evident that the valve body does not come into direct contact with the product to be introduced/tapped into/from the container to selectively allow it to flow into the tubing element. In other words, the throttling means of the valve body act indirectly on the liquid, pasty, granular or powder product by deforming the tubing element.

Advantageously, the valve body, not entering into direct contact with the product to be introduced/tapped into/from the container, can also be made with materials unsuitable for contact with foodstuffs.

LIST OF FIGURES

Further characteristics and advantages of the present invention will become more apparent from the description of an exemplary, but not exclusive, and therefore non-limiting preferred embodiment of a device for a container adapted to hold liquid, pasty, granular or powder products, as illustrated in the accompanying drawings, wherein:

FIG. 2b is an enlargement of a detail of FIG. 2a:

DETAILED DESCRIPTION

Even if not explicitly highlighted, the individual features disclosed with reference to the specific embodiments shall be understood as accessory to and/or interchangeable with other features disclosed with reference to other embodiments.

With reference to the accompanying figures, the present invention relates to a closing device 1 for a container 100 adapted to preferably hold liquid or pasty products, but also granulated or powder products.

In particular, the closing device and the relative container are configured to store liquid or pasty food products that, for hygienic reasons, may enter into contact only and exclusively with sterile surfaces and made of materials suitable for food contact.

Examples of food products are water, milk, fruit juices, sauces, creams, flours, sugar, dog treats and any other product in liquid, paste, granular or powder form usable for the nutrition of living beings.

The container 100 is of the flexible type, i.e. made of an easily deformable material, and has a volume 102 adapted to receive liquid or pasty, but also granulated or powder products.

Furthermore, the container 100 has a mouth 101 placed in fluid communication with the volume 102 to allow the introduction or extraction of such products into/from the container 100. In detail, the mouth 101 is configured to be crossed by the products listed above in a first direction to fill the volume 102 of the container 100, in a second direction, opposite to the first direction, to extract such products from the volume 102 of the container 100. In the context of the present invention, the movement of the products in the first direction is defined as a filling operation, while the opposite movement in the second direction is defined as a tapping operation.

The device 1 object of the present invention can be associated with the mouth 101 of the container 100 to allow carrying out such filling and tapping operations.

In detail, the device 1 is configured to be connected on opposite sides to the mouth 101 of the container 100 and to a tapping or filling head (not represented in the figures) adapted to move the product in liquid, paste, granular or powder form to or from the volume 102 of the container 100, to carry out the aforesaid tapping or filling operations.

Figure 2A:
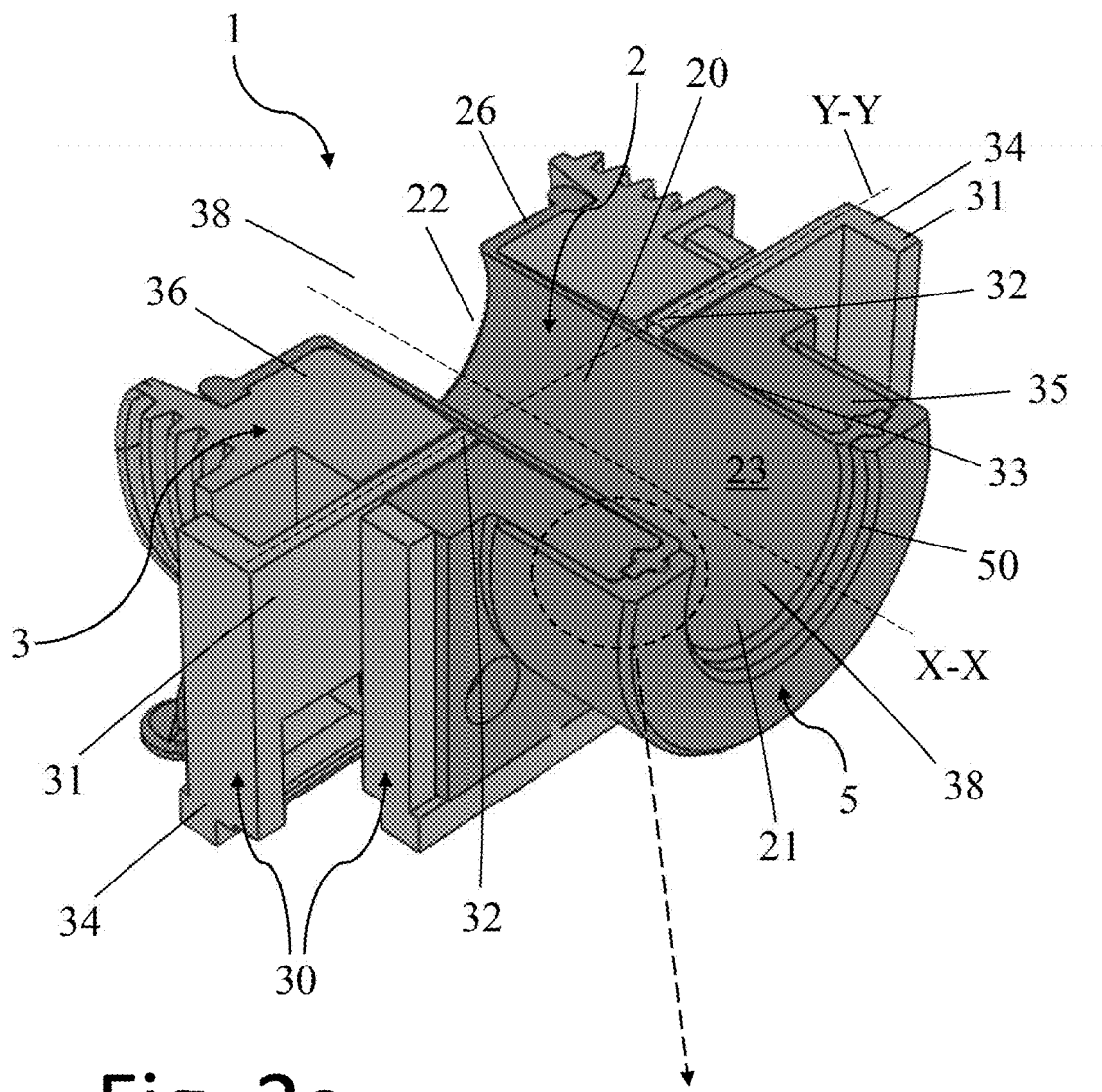
FIG. 2a shows a sectional view of the device of FIG. 1 in a rest configuration.
Figure 3:
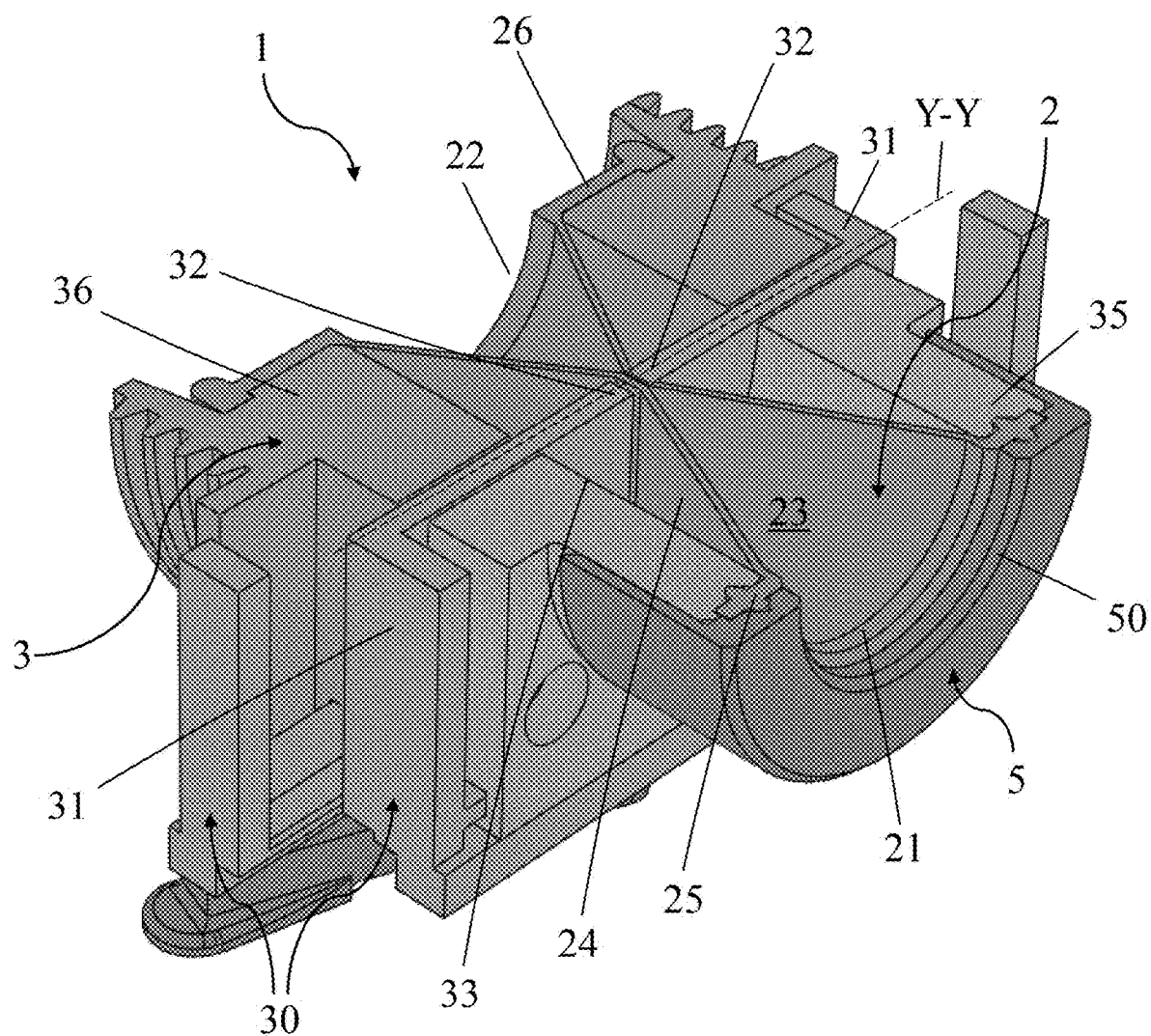
FIG. 3 shows a sectional view of the device of FIG. 1 in a clamped configuration.

As shown in FIGS. 2a and 3, the closing device 1 comprises a tubing element 2 defining a duct 20 configured to let the product that can be stored in the container 100 to flow in its inside.

In detail, the duct 20 extends between a first opening 21 that can be associated with the mouth 101 of the container 100, and a second opening 22 that can be engaged with the filling or tapping head to allow the aforesaid filling and tapping operations. It should be specified that during the filling operations the product flows in the duct 20 from the second to the first opening 22, 21, while in the tapping operations the product flows in the duct 20 from the first to the second opening 21, 22.

Preferably, the duct 20 extends mainly in an axial direction X-X, and has a cross-section for the passage of the product that is substantially circularly shaped. However, in alternative embodiments, the duct might have a curved extension and/or cross-sections with geometries other than circular.

In detail, the tubing element 2 defining the duct 20 is made of an elastically deformable material, i.e. having elastic properties that allow it to reversibly switch between an undeformed configuration, in which the cross-section of the duct 20 is substantially circular, and a deformed configuration, in which the cross-section of the duct 20 has a geometry other than the undeformed one.

It should be specified that in the deformed configuration, the duct 20 has a gap for the passage of the product that is smaller than the undeformed configuration. Indeed, in the deformed configuration, the duct 20 can be totally occluded, that is, it can have a null gap for the passage of the product, in at least in one of its points between the first and second openings 21, 22.

In FIG. 2a the tubing element 2 is represented in the undeformed configuration, while FIG. 3 shows the deformed and occluded tubing element 2 in an intermediate position between the first and second openings 21, 22.

In the event that the liquid, paste, granular or powder product is a food product, it has to be made of a material that is not only elastically deformable but also sterilizable.

Examples of materials usable for the realization of the tubing element 2 are polymeric ones with high elastic deformability or rubbery ones.

In alternative embodiments, the tubing element 2 could be of the so-called "disposable" type, in this case it is not necessary that it is repeatedly sterilizable, but it is sufficient that it is aseptic at the time of its installation and use.

In addition, the tubing element 2 has an inner wall 23 compatible with the liquid, paste, granular, or powder product, and an outer wall 24 opposite to the inner wall.

It should be specified that during the filling and tapping operations the product by flowing in the duct 20 comes into direct contact only with the inner wall 23 of the tubing element. Therefore, in the case where food products are stored, it is essential that it is aseptic in order to avoid their contamination.

When the tubing element 2 is in the deformed configuration occluding the duct 20, the inner wall 23 is completely closed on itself preventing the passage of the liquid, pasty, granular, or powder product.

Preferably, the outer and inner wall 24, 23, when the tubing element 2 is undeformed, are cylindrical and concentric, so as to be spaced in a radial direction R-R oriented orthogonally to the axial direction X-X. The distance between the outer and inner wall 24, 23 in the radial direction R-R is defined as the thickness of the tubing element.

With reference to FIGS. 2a and 3, the closing device 1 object of the present invention comprises a valve body 3 adapted to selectively allow the passage of the liquid, pasty, granular, or powder product through the duct 20 of the tubing element 2.

The valve body 3 is applied to the tubing element 2 and extends at least partially in the axial direction X-X between the first and second openings 21, 22.

In detail, the valve body 3 comprises a channel 33 extending thereacross in the axial direction X-X within which the tubing element 2 is arranged. Precisely, the channel 33 of the valve body 3 is configured to enter into contact with the outer wall 24 of the tubing element 2.

The channel 33 is accessible on opposite sides in the axial direction X-X by a pair of openings 38 respectively arranged at the first and second openings 21, 22 of the tubing element 2. In detail, as shown in FIGS. 2*a* and 3, an opening 38 of the channel 33 is facing and placed in fluid communication with the first opening 21 of the tubing element 2, while the other opening 38 of the channel 33 is facing and placed in fluid communication with the second opening 22 of the tubing element 2.

It should be specified that the tubing element 2 and the duct 20 extend at least partially in the axial direction X-X between the openings of the channel 33 of the valve body 3.

With reference to FIGS. 2*a* and 3, the valve body 3 comprises throttling means 30 operable between a clamped configuration and a rest configuration to switch the tubing element 2 between the undeformed and the deformed configuration.

In the clamped configuration, said throttling means 30 are configured to engage the tubing element 2 in an intermediate position between the first and second openings 21, 22. In detail, in the clamped configuration, the throttling means 30 by engaging the tubing element 2 exert thereon a pressure that deforms it completely occluding the duct 20. Therefore, the throttling means 30 by acting on the tubing element 2 allows to inhibit the motion of the liquid, paste, granular, or powder product between the first and the second openings 21, 22 of the tubing element 2.

Conversely, in the rest configuration the throttling means 30 are configured to disengage the tubing element 2 thus leaving it in its undeformed state. Therefore, it should be specified that when the throttling means 30 are in the rest configuration the liquid, pasty, granular, or powder product is free to flow within the duct 20 between the first and second openings 21, 22 of the tubing element 2.

In greater detail, in the clamped configuration the throttling means 30 are configured to engage the outer wall 24 on opposite sides to deform the tubing element 2 and cause the inner wall 23 to close on itself. In other words, the throttling means act as a clamp "biting" the outer wall 24 of the tubing element 2.

It should be noted that the throttling means 30 of the valve body 3 act indirectly on the product that is inside the duct 20. Therefore, it is evident that the throttling means 30 do not come into direct contact with the product to be stored/extracted in/from the container 100, consequently, in the case of food products, it is not necessary that the throttling means 30 are made of materials suitable for contact with food products.

In general, in accordance what is shown in FIGS. 2*a* and 3, no component of the valve body 3 enters into contact with the product to be stored or extracted from the container 100, therefore, the entire valve body 3 can be made also of materials that are not suitable for contact with food products.

Preferably, the throttling means 30 comprise a pair of jaws 31 that can be moved toward and away from each other in a direction Y-Y transverse, in particular orthogonal, to the axial direction X-X to switch the throttling means 3 between the clamped configuration and the rest configuration.

In a first embodiment, shown in the accompanying figures, both jaws 31 are movable in order to move toward and away from each other.

In a second embodiment, not shown in the accompanying figures, one jaw is fixed and the other is movable in the transverse direction Y-Y, so as to move toward and away from the fixed jaw.

Each jaw 31 of the throttling means 30 comprises a pushing edge 32 configured to engage the outer wall 24 of the tubing element 2 to exert a force/pressure on the latter in the transverse direction Y-Y. The tubing element 2 when subjected to the pressure exerted by the pushing edge 32 deforms switching from the undeformed to the deformed configuration.

It should be specified that the pushing edges 32 of the two distinct jaws 31 are opposed, and are configured to impart opposite forces on the tubing element 2. Opposite forces are forces acting in the same transverse direction Y-Y but oriented in opposite directions.

When the throttling means 30 are in the clamped configuration, the pushing edges 32 are close to one another in the transverse direction Y-Y, while in the rest configuration they are spaced apart in the transverse direction Y-Y. Precisely, the distance between the pushing edges 32 in the transverse direction Y-Y in the clamped configuration is shorter than their distance in the rest configuration. Even more precisely, in the clamped configuration the distance between the pushing edges 32 in the transverse direction Y-Y is about two times the thickness of the duct 20 of the tubing element, i.e. it is about two times the distance between the inner wall 23 and the outer wall 24 in the radial direction R-R.

The closing device 1 object of the present invention comprises drive means 4 kinematically connected to the jaws 31 of the throttling means 30 to move them toward or away from each other in the transverse direction Y-Y. In detail, the drive means 4 are configured to move the pushing edges 32 of the jaws 31 toward and away from each other in the transverse direction Y-Y.

It should be specified that in the first embodiment the drive means 4 are connected to both jaws 31, while in the second embodiment they are connected only to the movable jaw and not to the fixed one.

Figure 1:
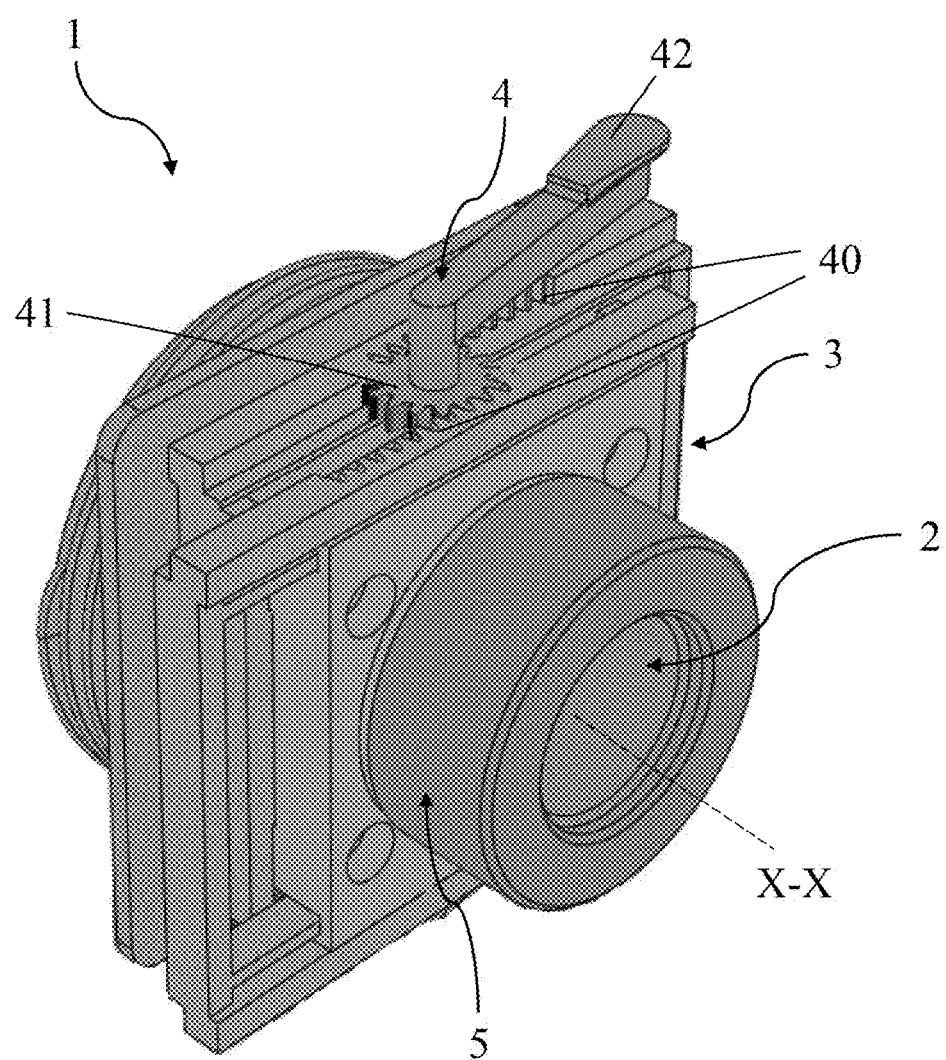
FIG. 1 shows a perspective view of a closing device for a container adapted to hold liquid, paste, granular or powder products according to the present invention.

As shown in FIG. 1, in the first embodiment, the drive means 4 comprise a pair of racks 40, a pinion 41, and an operating lever 42.

In detail, each rack 40 is arranged on a respective jaw 31 so that its movement is integral with that of the respective pushing edge 32. Furthermore, the racks 40 are facing each other in the axial direction X-X, and extend parallel to the transverse direction Y-Y.

The term rack means a linear mechanical member having a plurality of teeth arranged in succession and configured to engage with respective teeth of a toothed wheel, defined as a pinion.

The pinion 41 is interposed between the racks 40 in the axial direction X-X so as to be kinematically coupled, on opposite sides, with each rack 40. In detail, the pinion 41 is configured to rotate around an axis of rotation perpendicular to the transverse direction Y-Y to move the two racks 40 in opposite directions, so as to move the respective jaws 31 toward and away from each other. Thus, the pinion 41, by rotating around its axis of rotation, switches the throttling means between the clamped and the rest configuration.

The operating lever 42 is configured to control the rotation of the pinion 41 about its axis of rotation, so as to cause the movement of the jaws 31 in the transverse direction Y-Y. In use, the lever is manually or electronically operated to switch the throttling means 30 between the clamped and the rest configuration, i.e. to move the pushing edges 32 of the jaws 31 toward and away from each other to deform the tubing element 2.

Preferably, as shown in the accompanying figures, each jaw 31 comprises a flat wall extending in the transverse direction Y-Y between the pushing edge 32 and a free edge 34, opposite to the pushing edge 32. Even more preferably, the pushing edge 32 and the free edge 34 are oriented in parallel, and the rack 40 extends in the transverse direction Y-Y therebetween.

As shown in FIGS. 2a and 3, the pushing edges 32 of the distinct jaws 31 are facing each other in the transverse direction Y-Y and are aligned in the axial direction X-X.

In order to fix the tubing element 2 inside the channel 33 of the valve body 3 in the axial direction X-X, the tubing element comprises a first and a second flange 25, 26 adapted to engage respectively with a first and a second abutment wall 35, 36 of the valve body 3.

In detail, the first and second flanges 25, 26 are respectively arranged at the first and second openings 21, 22. Each flange 25, 26 surrounds the respective opening and extends therefrom in the radial direction R-R.

The first and second abutment walls 35, 36 are arranged on opposite sides of the channel 33 of the valve body 3 and are shaped to receive respectively the first and second flanges 25, 26 abuttingly when the tubing element 2 is arranged in the channel 33 of the valve body 3.

Figure 2B:
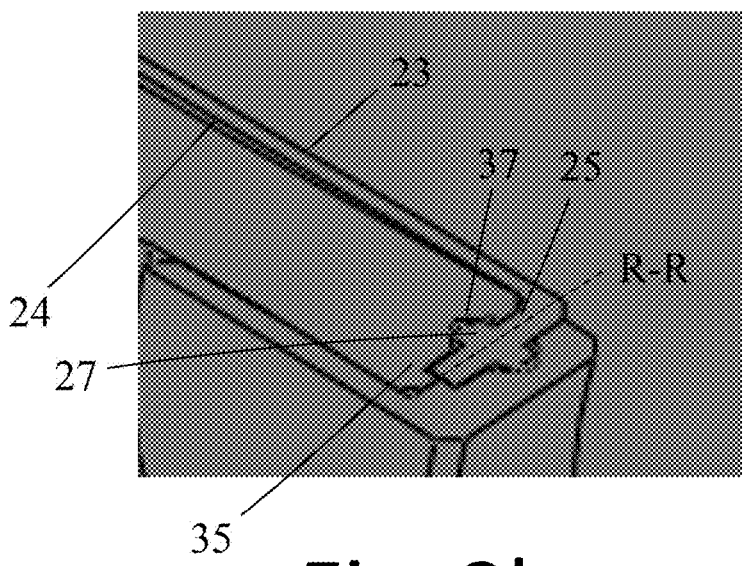

As shown in FIGS. 2a and 2b, the first and second flanges 25, 26 stop respectively against the first and second abutment walls 35, 36 abuttingly, locking the relative position in the axial direction X-X of the tubing element 2 with respect to the valve body 3.

Preferably, in accordance with what is shown in FIGS. 2a and 2b, each flange 25, 26 of the tubing element comprises a protuberance 27 extending, at least in part, parallel to the axial direction X-X.

Each abutment wall 35, 36 comprises a recess 37 geometrically complementary to the protuberance 27 of the respective flange 25, 26, adapted to receive it when the tubing element 2 is arranged in the channel 33 of the valve body 3.

Each protuberance 27 when inserted into the respective recess 37 is configured to retain the tubing element 2 inside the valve body 3. In particular, each protuberance 27 when inserted into the respective recess 37 is configured to fix the flange 25, 26 to the corresponding abutment wall 35, 36.

Preferably, the closing device 1 object of the present invention comprises a locking element 5 configured to press the first flange 25 against the abutment wall 35 in the axial direction X-X. The locking element 5 also presses the protuberance 27 of the first flange inside the recess 37 of the first abutment wall 35.

The locking element 5 has a central opening 50 that can be associated with the mouth of the container 100.

Figure 4:
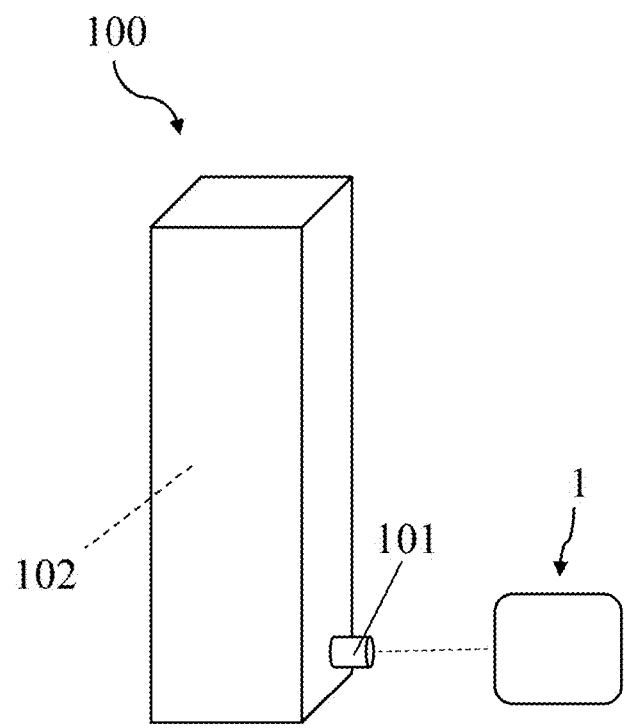
FIG. 4 shows a schematic representation of a container provided with the device of FIG. 1 in accordance with the present invention.

It is also an object of the present invention a container 1 for storing in particular liquid or pasty, but also granular or powder products having a volume 102 and a mouth 101, in accordance with what is indicated in the initial part of the detailed description. As shown in FIG. 4, the container 100 object of the present invention is of the deformable type and comprises the closing device 1 described above.

In detail, the closing device 1 is constrained to the mouth 101 of the container through the first opening 21 of the tubing element 2, so that a filling or tapping head connected to the second opening 22 can carry out the aforementioned filling and tapping operations.

The throttling means 30 of the valve body 3, when they are in the clamped configuration, inhibit access to the volume 102 of the container through the mouth 101 by occluding the duct 20 of the tubing element 2 in accordance with the above description.

Conversely, the throttling means 30 of the valve body 3, when they are in the rest configuration leave the tubing element 2 in its undeformed state, allow access to the volume 102 of the container 100 enabling the filling and tapping operations.

Clearly, in order to satisfy contingent and specific needs, a person skilled in the art may make numerous modifications and variants to the configurations described above. Such modifications and variations are all also contained within the scope of the invention, as defined by the following claims.

The invention claimed is:

1. A closing device for a container adapted to hold liquid, pasty, granular or powder products, said device being associable with a mouth of said container, said device comprising:
    a tubing element defining a duct extending between a first opening configured to be associated with the mouth of the container and a second opening configured to be engaged with a filling or tapping head, the tubing element being made of elastically deformable material;
    a valve body applied to the tubing element and configured to selectively allow the passage of the liquid, pasty, granular or powder product through the duct of the tubing element, the valve body comprising throttling members operable between a clamped configuration in which they are configured to engage, in an intermediate position between the first and second openings, the tubing element thereby deforming it to occlude the duct, and a rest configuration in which they are configured to disengage the tubing element leaving it in its undeformed state, the duct extends mainly in an axial direction;
    the throttling members comprise a pair of jaws configured to be moved toward and away from each other in a direction transverse to the axial direction to switch the throttling members between the clamped configuration and the rest configuration;
    each jaw of the throttling members comprise a pushing edge configured to exert a pressure on the tubing element in the transverse direction to elastically deform it;
    drive members kinematically connected to each jaw of the throttling members and configured to move the pushing edges of the jaws toward and away from each other in the transverse direction,
    wherein said drive members comprise:
    a pair of racks each arranged on a respective jaw, the racks facing each other in the axial direction and extending parallel to the transverse direction;
    a pinion interposed between the pair of racks in the axial direction and kinematically coupled to each rack on opposite sides;
    an operating lever adapted to control the rotation of the pinion to drive the jaws in the transverse direction thus switching the throttling members between the clamped configuration and the rest configuration.

2. A device according to claim 1, wherein:
    the tubing element comprises an inner wall compatible with the liquid, pasty, granular or powder product and an outer wall opposite to the inner wall;

in the clamped configuration the throttling members are configured to engage the outer wall on opposite sides so as to deform the tubing element and close the inner wall on itself.

3. A device according to claim 1, wherein each jaw is substantially a flat wall extending in the transverse direction and delimited at one of its ends by a pushing edge, the pushing edges of the distinct jaws being facing each other in the transverse direction and being aligned in the axial direction.

4. A device according to claim 1, wherein:
the tubing element comprises a first flange and a second flange arranged at the first and second openings respectively, each flange surrounding the respective opening and extending therefrom in a radial direction;
the valve body comprises a channel extending thereacross and adapted to receive the tubing element;
the valve body comprises a first and a second abutment wall configured to engage the first and second flanges, respectively;
when the tubing element is arranged in the channel of the valve body, the first and second flanges stop respectively against the first and second abutment walls abuttingly, thereby fixing the tubing element inside the channel.

5. A device according to claim 4, wherein:
each flange of the tubing element comprises a protuberance;
each abutment wall comprises a recess adapted to receive the protuberance of a respective flange;
when the tubing element is arranged in the channel of the valve body each protuberance is fixed in the respective recess to retain the tubing element inside the valve body.

6. A device according to claim 4, comprising a locking element configured to press the first flange against the first abutment wall, said locking element having a central opening that is configured to be associated with the mouth of the container.

7. A device according to claim 1, wherein the duct of the tubing element is made of sterilizable material.

8. A container for storing liquid, pasty, granular or powder products, defining a volume adapted to receive a liquid, pasty, granular or powder product and a mouth placed in fluid communication with said volume to allow filling or tapping operations, said container comprising a closing device associable with the mouth of said container, said closing device comprising:
a tubing element defining a duct extending between a first opening configured to be associated with the mouth of the container and a second opening configured to be engaged with a filling or tapping head, the tubing element being made of elastically deformable material;
a valve body applied to the tubing element and configured to selectively allow the passage of the liquid, pasty, granular or powder product through the duct of the tubing element, the valve body comprising throttling members operable between a clamped configuration in which they are configured to engage, in an intermediate position between the first and second openings, the tubing element thereby deforming it to occlude the duct, and a rest configuration in which they are configured to disengage the tubing element leaving it in its undeformed state, the duct extends mainly in an axial direction;
the throttling members comprise a pair of jaws configured to be moved toward and away from each other in a direction transverse to the axial direction to switch the throttling members between the clamped configuration and the rest configuration;
each jaw of the throttling members comprise a pushing edge configured to exert a pressure on the tubing element in the transverse direction to elastically deform it;
drive members kinematically connected to each jaw of the throttling members and configured to move the pushing edges of the jaws toward and away from each other in the transverse direction,
wherein:
said drive members comprise:
a pair of racks each arranged on a respective jaw, the racks facing each other in the axial direction and extending parallel to the transverse direction;
a pinion interposed between the pair of racks in the axial direction and kinematically coupled to each rack on opposite sides;
an operating lever adapted to control the rotation of the pinion to drive the jaws in the transverse direction thus switching the throttling members between the clamped configuration and the rest configuration
the first opening of the tubing element is engaged with the mouth of the container;
the throttling members of the valve body, when they are in the clamped configuration, inhibit access to the volume of the container through the mouth by occluding the duct of the tubing element, and when they are in the rest configuration, allow access to the volume of the container, leaving the tubing element in its undeformed state.

* * * * *